United States Patent [19]

Yang

[11] Patent Number: 4,730,655

[45] Date of Patent: Mar. 15, 1988

[54] TIRE CHAIN DEVICE FOR AUTOMOBILES TRAVELLING ON SNOW-COVERED TERRAIN

[76] Inventor: Ming F. Yang, 95, Jin-ho Rd., Tainan, Taiwan

[21] Appl. No.: 815,138

[22] Filed: Dec. 18, 1985

[51] Int. Cl.[4] ........................ B60C 27/12; B21D 7/00; B21F 15/00

[52] U.S. Cl. ............................. 152/213 A; 24/68 TT; 81/15.8; 152/219; 152/242

[58] Field of Search ............................ 152/213 R–219, 152/231, 239, 241, 242; 81/15.8; 403/192, 193, 223; 24/68 TT, 68 CT, 68 BT, 70 T, 70 TT, 116 R, 265 AL; 277/116.4; 29/433, 241

[56] References Cited

U.S. PATENT DOCUMENTS

| | | | |
|---|---|---|---|
| 1,358,391 | 11/1920 | Pendleton | 152/242 |
| 4,416,318 | 11/1983 | Rieger | 152/242 X |
| 4,679,608 | 7/1987 | Jeindl | 152/219 X |

*Primary Examiner*—Donald E. Czaja
*Assistant Examiner*—Thomas Bokan
*Attorney, Agent, or Firm*—Lowe, Price, LeBlanc, Becker & Shur

[57] ABSTRACT

This invention relates to a tire chain device for automobiles travelling on snow-covered terrain and, in particular, to one having two steel hoops connected by a plurality short lengths of chains, a plurality of plastic tubes enclosing the steel hoops, two packings located between every two of the plastic tubes, a plurality of guide rings disposed between adjacent packings of one of the steel hoops, a ring member disposed at each end of the steel hoops and a binding chain connected to one ring member of one of the steel hoops. During use of the device the plurality of short lengths of chains are held tightly across the outside of the tire, disposed to be substantially parallel to the axis of tire rotation to enhance traction.

1 Claim, 7 Drawing Figures

TIRE CHAIN DEVICE FOR AUTOMOBILES TRAVELLING ON SNOW-COVERED TERRAIN

BACKGROUND OF THE INVENTION

It is known to use chain to fit round an automobile tire to enable the automobile to travel on snow-covered terrain. However, it is found that the chain fitted round the tire has an annoying tendency to loosen or become untied. Besides being annoying, such loosening can become dangerous when the automobile is travelling on snow.

It is, therefore, an object of the present invention to provide a tire chain device which may obviate and mitigate the above-mentioned drawbacks.

SUMMARY OF THE INVENTION

It is an object of the present invention to provide a tire chain device which is designed to enable an automobile to travel on snowy ground without slipping.

It is another object of the present invention to provide a tire chain device which utilizes two steel hoops connected by a plurality of short lengths of chains to fit round a tire so as to increase frictional force between the tire and the snow-covered surfaces.

It is still another object of the present invention to provide a tire chain device which is easy to use.

It is still another object of the present invention to provide a tire chain device which is simple in construction.

It is still another object of the present invention to provide a tire chain device which is easy to manufacture.

It is a further object of the present invention to provide a tire chain device which is inexpensive to produce.

Other objects and merits and a fuller understanding of the present invention will be obtained by those having ordinary skill in the art when the following detailed description of the best mode contemplated for practicing the invention is read in conjunction with the accompanying drawings wherein like numerals refer to like or similar parts.

DETAILED DESCRIPTION OF THE PREFERRED EMBODIMENT

Figure 1:
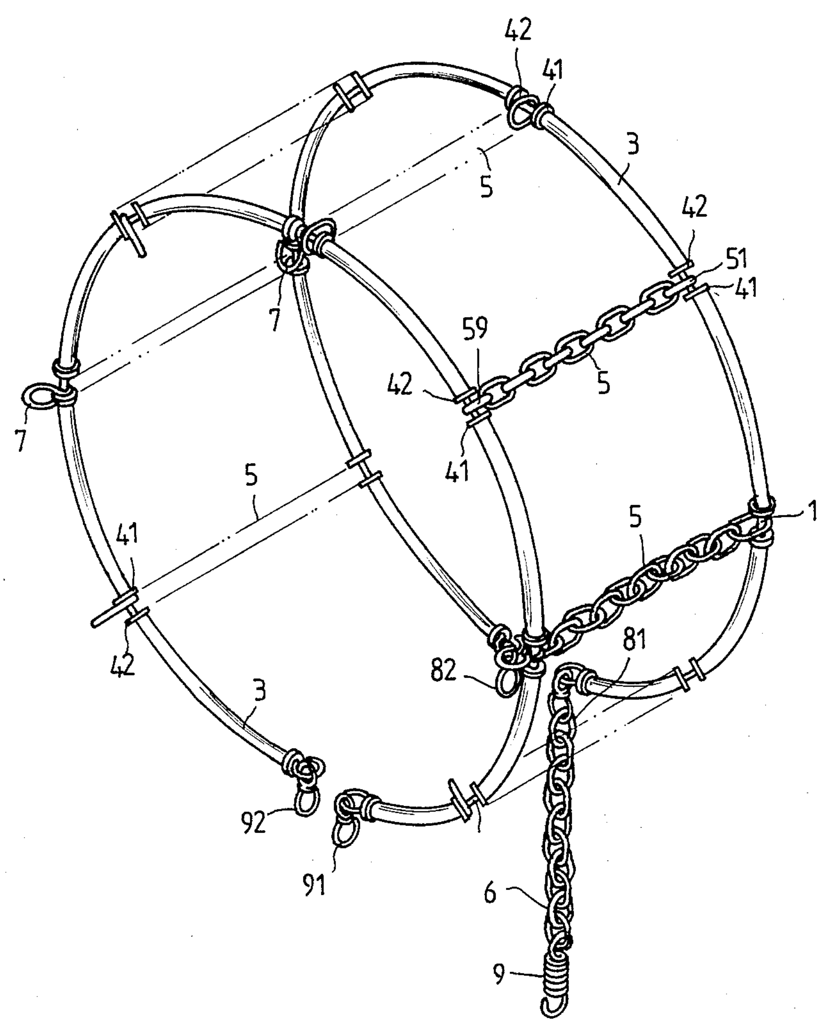
FIG. 1 is a perspective view of a tire chain device for automobiles travelling on snow-covered terrain according to the present invention.
Figure 2:
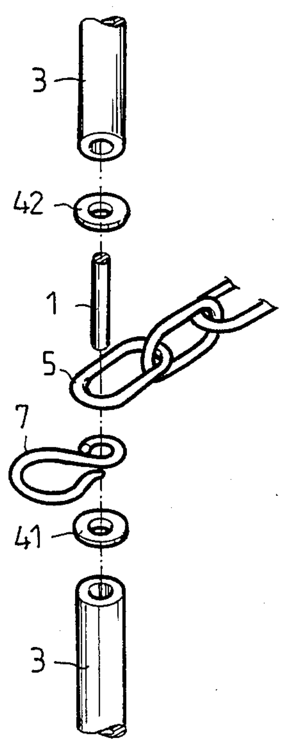
FIG. 2 is a partial exploded view of a portion of the present invention.
Figure 3:
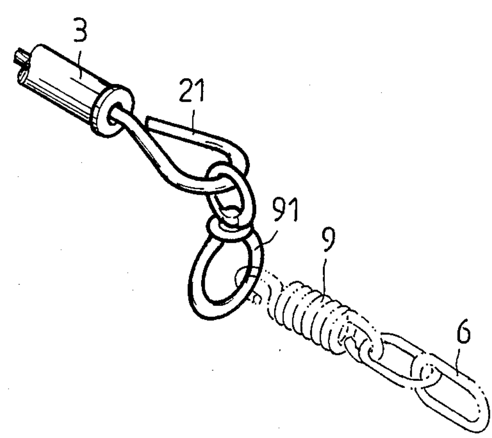
FIG. 3 is a fragmentary view of the present invention
Figure 4:
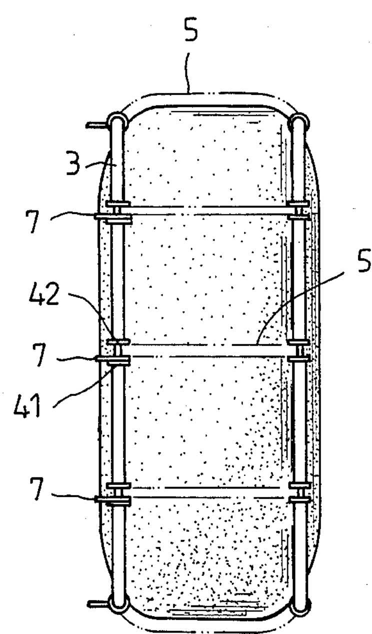
FIG. 4 illustrates an application of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

With reference now to the drawings, the present invention comprises two steel hoops 1 and 2, a plurality of short lengths of chains 5, plastic tubes 3, packings 41 and 42, guide rings 7, retaining rings 81, 82, 91 and 92 a binding chain 6 and a spring hook 9. The ends of each of the steel hoops 1 and 2 are respectively bent into two loops 11 and 21. However, it should be noted that other component parts should be mounted to the steel hoops 1 and 2 before the formation of the two loops 11 and 21. The steel hoops 1 and 2 are enclosed by a plurality of plastic tubes 3. Between every two adjacent tubes 3 there are two packings 41 and 42.

Each chain 5 is formed with two ends 59 and 51. The former is connected between packings 41 and 42 of steel hoop 2 while the latter is correspondingly connected between packings 41 and 42 of the steel hoop 1. Consequently, the two ends 59 and 51 cannot move over the plastic tubes 3 and this will enable the chains 5 to produce larger frictional force when held tightly across the outside surface of the tire and thereby put in contact with the snow on the ground. The steel hoop 2 further comprises a guide ring 7 between each packing 41 and 42. The two ends of steel hoop 1 are respectively connected with retaining rings 81 and 82 while the two ends of steel hoop 2 are respectively connected with retaining rings 91 and 92 such that the plastic tubes 3, packings 41 and 42, chains 5 and guide rings 7 are prevented from withdrawing therefrom. One of the retaining rings 81 and 82 is connected with a binding chain 6.

When in use, the steel hoops 1 and 2 are first fitted round the inner surface and outer surface of a tire respectively, so that the short lengths of chains 5 located between the steel hoops 1 and 2 are disposed round the outer surface of the tire to be substantially parallel to the axis of rotation of the tire.

Figure 5:
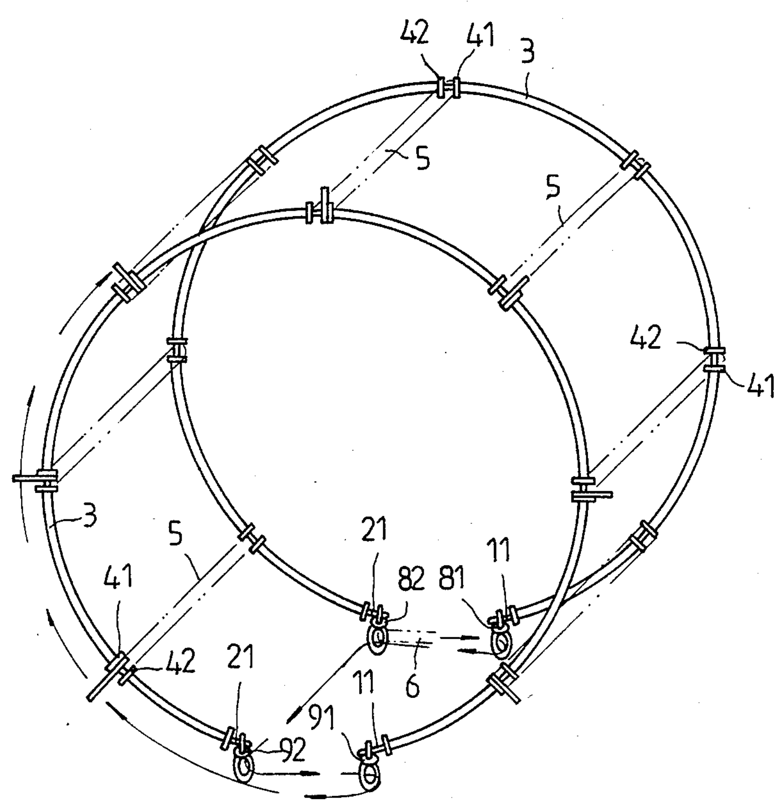
FIG. 5 illustrates how to connect the binding chain to the steel hoops in a preferred embodiment of the present invention.
Figure 6:
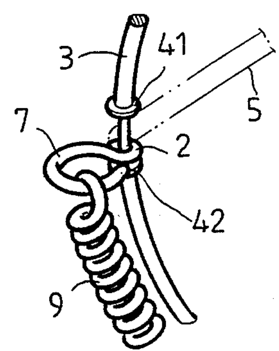
FIGS. 6 and 7 are enlarged views illustrating a portion of the invention in place according to FIG. 4.
Figure 7:
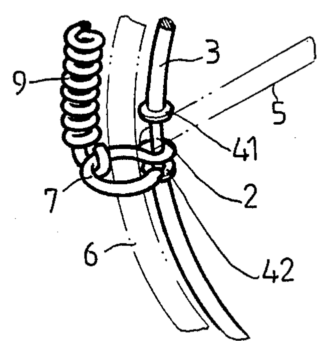

Then, as best understood with reference to FIG. 5, the binding chain 6, attached to retaining ring 81 of steel hoop 1 is passed through the retaining ring 82 of steel hoop 1 and retaining rings 91 and 92 of the steel hoop 2, and then pulled tightly around the outside of the tire. Finally, the binding chain 6 is passed through the guide rings 7 and connected by spring hook 9 with a guide ring 7. Since the tire chain is tightly fitted round the tire, a large frictional force will be produced between the outer surface of the tire and the snow-covered terrain therebelow thereby enabling the tire to rotate thereon.

The embodiment of the invention which has been described and illustrated herein is but an illustration of the invention. Other embodiments and modifications will occur to those skilled in the art. No attempts have been made to illustrate all possible embodiments of the invention, and it is intended to comprehend herein such modifications of the illustrated device and further applications as would normally occur to one skilled in the art to which the invention relates.

I claim:

1. A tire chain device for mounting to a tire of an automobile travelling on snow-covered terrain, comprising:

first and second steel hoops connected by a plurality of equal short lengths of chains, each said hoop having a gap between the respective ends of said hoop, each end of each said hoop being formed into a ring;

a plurality of plastic tube lengths in sequence enclosing each of said steel hoops;

two packings located between adjacent ones of said plurality of plastic tubes on each of said two hoops;

a guide ring disposed between every two packings of said second steel hoop for guiding a binding chain therethrough;

a ring member disposed at each end of each of said two steel hoops; and said binding chain connected at a first end to one ring member of said first hoop, said binding chain having a spring-loaded hook at a second end;

whereby said binding chain is attachable by said hook to said second hoop, to tightly fit said first hoop round an inner side of said tire and said second hoop round an outer side of said tire so that said plurality of equal short lengths of chains are disposed across the outer periphery of said tire substantially parallel to the axis of rotation of said tire.

* * * * *